Inventor:
JOSUA ROFFLER

United States Patent Office 3,472,209
Patented Oct. 14, 1969

3,472,209
APPARATUS FOR SEPARATING WATER FROM WET STEAM PRIOR TO SUPERHEATING OF THE STEAM
Josua Roffler, Winterthur, Switzerland, assignor to Sulzer Brothers, Ltd., Winterthur, Switzerland, a corporation of Switzerland
Filed Sept. 6, 1968, Ser. No. 757,916
Claims priority, application Switzerland, Sept. 7, 1967, 12,540/67
Int. Cl. F22g *3/00;* F22b *37/26;* F28b *1/00*
U.S. Cl. 122—459       7 Claims

ABSTRACT OF THE DISCLOSURE

The separator is positioned in the flow of wet steam and includes a horizontally disposed tank having a lower portion containing separator elements and an upper portion containing superheater tubes. The wet steam is introduced into the upper portion of the tank along side the superheater tubes to flow longitudinally of the axis of the tank and is thereafter distributed uniformly into the lower section of the tank to flow upwardly through the separators. Water is separated out in the lower section by gravity and by the separators. The dehydrated steam then flows upwardly into the superheater and flows out of the tank.

---

This invention relates to an apparatus for separating water from wet steam in steam power stations.

It has been known in the past to supply steam power stations with wet steam, for example, from subterranean sources and to separate the water from the steam prior to superheating of the steam. In order to separate the water from the steam, such steam power stations have utilized apparatus in which the wet steam is at first partially expanded in a high pressure stage so that water droplets can be removed from the steam. The steam is then superheated by a flow of high pressure saturated steam before being fed to a second pressure stage of the prime mover. However, such separator techniques have required large spaces within which to carry out the separation of the water from the steam.

Briefly, the present invention provides an apparatus of limited space for separating water from wet steam so that the wet steam can be subsequently superheated. The apparatus includes a horizontally disposed and substantially cylindrical tank having a lower portion which contains water separator elements and an upper portion which contains a bank of superheater tubes. The flow of wet steam is passed into one end of the tank to flow, at first, longitudinally of the tank and then circumferentially before flowing through the water separators to the bank of superheater tubes. The flow of superheated steam then flows radially out of the tank. The superheater tubes in the upper tank portion are arranged longitudinally of the tank and are disposed between two walls which also extend longitudinally of the tank. Each of these walls cooperates with a spigot at one end of the tank and the sidewalls of the tank to confine the inflow of wet steam to a longitudinal distribution chamber in the upper portion of the tank alongside the bank of superheater tubes. In addition, each wall has a portion on each side of the tank which separates the distribution chamber from the lower portion of the tank. Further, each of these wall portion has at least one aperture therein for conducting flow of wet steam therethrough into a lower portion of the tank for subsequent flow through the water separators disposed therein. The apertures between the distribution chambers and the lower portion of the tank are arranged in such a way that wet steam flowing through them is hurled against the inner walls of the tank so that some of the water droplets are removed from the wet steam before reaching the water separators. This provides an additional separation action.

In one embodiment, the portions of each wall which separate the upper portion of the tank from the lower portion of the tank merge into walls which are inclined to the vertical central plane of the tank. Each of these latter walls extends close to the adjacent tank side wall and is formed with a plurality of apertures to communicate the associated distribution chamber to the lower portion of the tank. This further improves the extra separating action of the tank since the wet steam is hurled with even greater force against the tank wall through the apertures of the inclined walls. The apertures of this embodiment are in the form of a slot having an edge nearest the flow of steam curved towards the lower portion of the tank by a quarter radius of approximately slot width. This construction uses the known "Coanda" effect in order to improve the uniform distribution of the wet steam to the lower portion of the tank.

The lower portion of the tank below the water separator elements is subdivided into two parallel chambers by a wall disposed in the vertical central plane of the tank and which extends from the water separator elements to the bottom of the tank. By thus subdividing the lower portion of the tank, the currents of steam arising from the two distribution channels and entering the lower separator element become stabilized at high speed of steam flow and therefore do not interfere with each other.

In operation, the flow of wet steam initially enters the tank and flows longitudinally along the distribution chambers. Thereafter, the wet steam enters into the lower portion of the tank through the apertures in the walls between the upper and lower tank portions. Droplets of water are then hurled against the sides of the tank and run down the walls of the tank to the lowermost portions of the tank. At the same time, wet steam is directed to flow upwardly through the water separator elements towards the bank of superheater tubes in the upper portion of the tank. In flowing through the water separator elements, the wet steam is further dehydrated so that the steam passing into the superheater tubes is free of any water droplets or particles. After passing over the superheater tubes, the steam is then let out of the tank through one or more spigots in the upper portion of the tank.

The invention will become more apparent from the following detailed description and the accompanying drawings in which.

Figure 1:
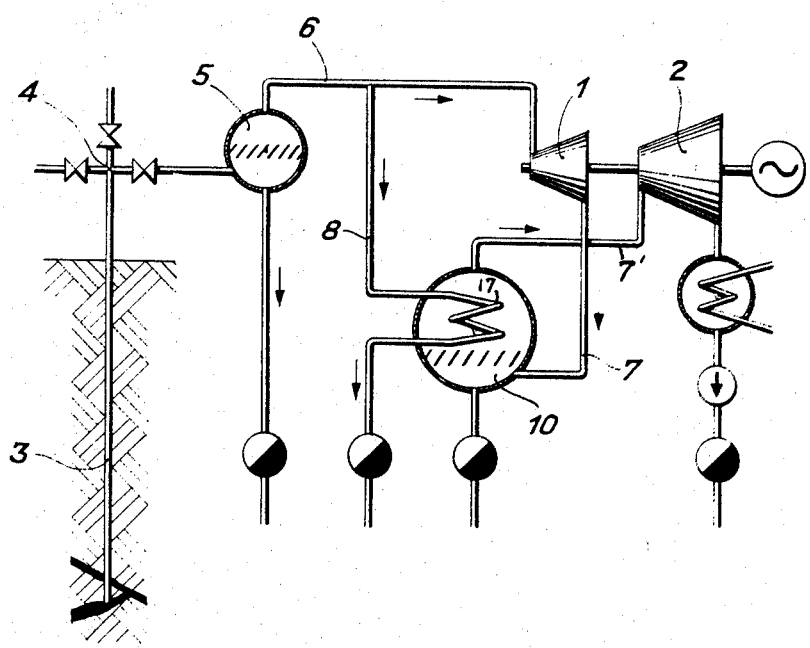
FIG. 1 illustrates a schematic flow diagram of a steam power station embodying the apparatus of the invention.

Referring to FIG. 1 the steam power station includes a high pressure turbine 1 and a low pressure turbine 2 which utilize steam originating from a subterranean source. The wet steam is initially collected in a line 3 from underground and is conveyed via a distributing cross 4 to a saturated steam separator 5 in which the steam is first dried. A line 6 connects the separator 5 to the high pressure turbine 1 to deliver a flow of steam thereto. The high pressure turbine 1 is further connected by line 7 to a unit 10 wherein water droplets in the steam are removed so that the steam can then be transferred into the low pressure turbine 2 downstream of the unit 10. A line 8 which branches from line 6 conducts a second flow of steam from the separator 5 through the unit 10 in a heat exchange relation with the dehydrated steam passing through the unit 10. The partially exanded steam leaving the unit 10 is supplied via a line 7' to the lower pressure turbine 2.

Figure 3:
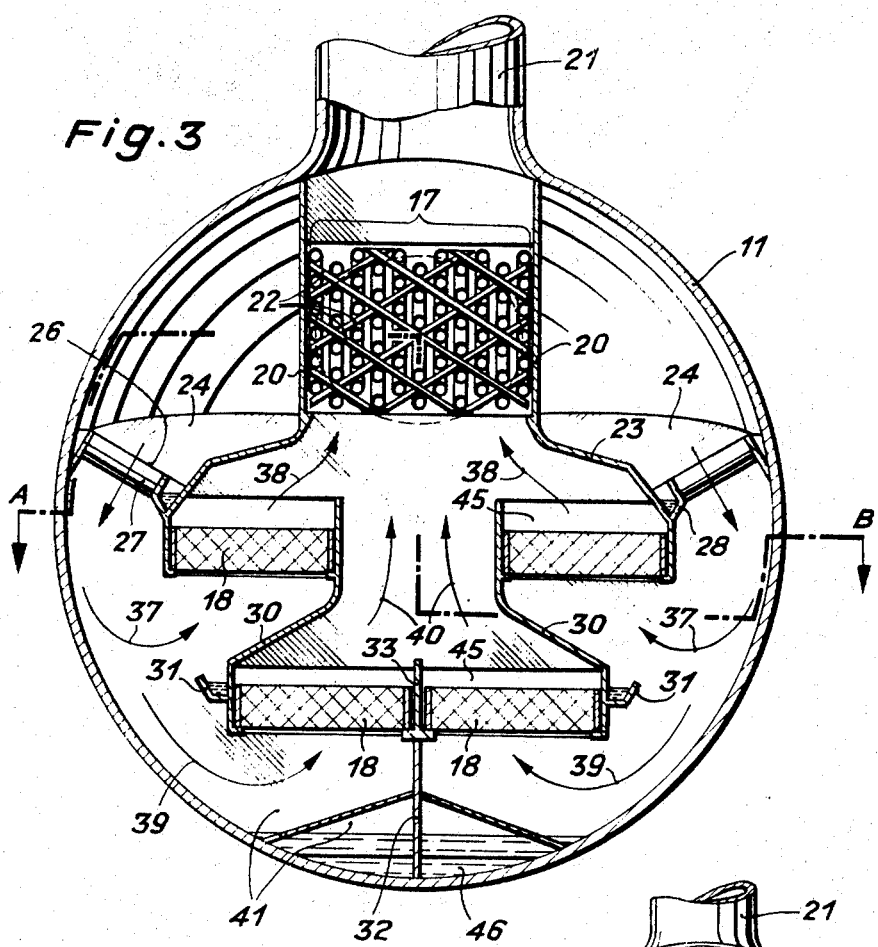
FIG. 3 illustrates a cross section through the apparatus of the invention.
Figure 2:
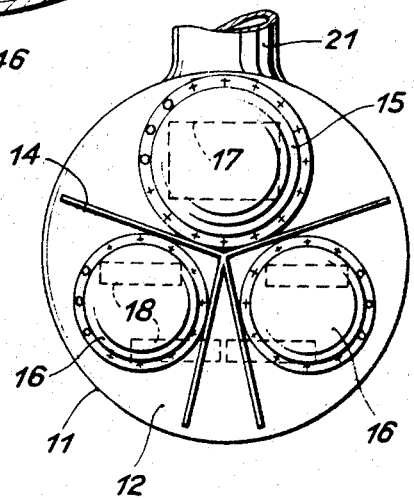
FIG. 2 is a front view of an apparatus according to the invention.
Figure 4:
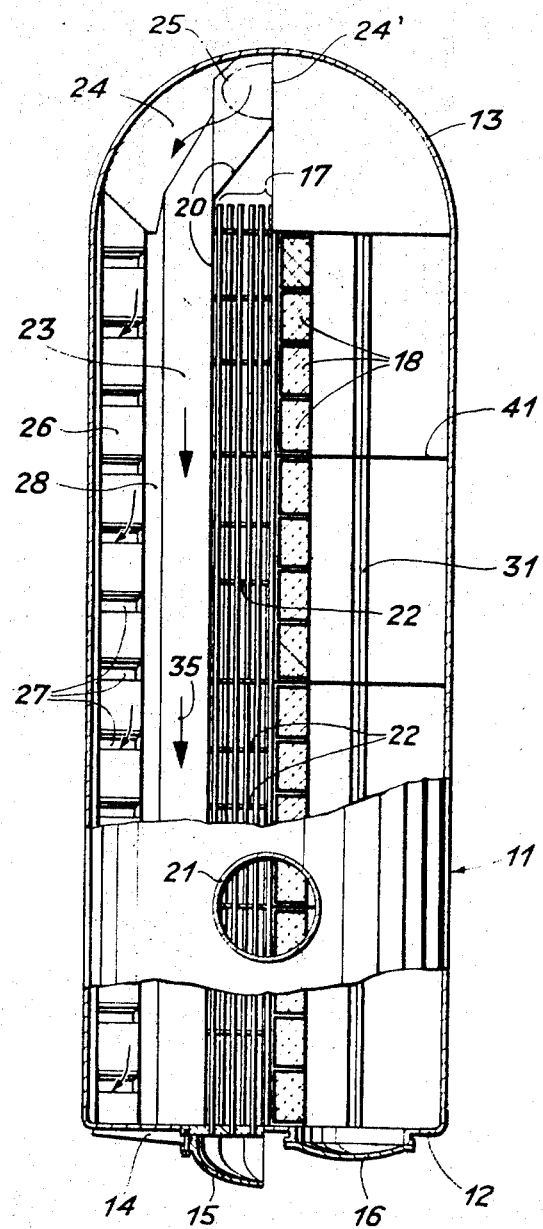
FIG. 4 illustrates a view taken on line A–B of FIG. 3.

Referring to FIGS. 2 to 4, the unit 10 includes a horizontally disposed cylindrical tank 11 having a flat end wall 12 at the front and a hemispherical end wall 13 at the rear. The front flat wall 12 is reinforced on the exterior by a plurality of radial ribs 14 and has a plurality of covers 15, 16 which close off respective apertures for a bank of tubes 17 and a plurality of water separator elements 18. The covers 15, 16 are removably so that the bank of tubes 17 and water separator elements 18 can be inserted into and removed from the tank 11 longitudinally. The bank of tubes 17 is disposed in the upper portion or upper half of the tank 11 while the water separator elements 18 are disposed in two stages in the lower half or lower portion of the tank 11 below the bank of tubes 17; each stage including a pair of separator elements.

Referring to FIG. 3, the bank of tubes 17 is connected to the line 8 (FIG. 1) so as to receive a flow of high pressure saturated steam. The bank of tubes 17 is further disposed between two vertically disposed partition walls 20 which extend longitudinally from the front wall 12 to the hemispherical wall 13. The partition walls 20 are secured to the front wall 12 and are sealingly secured to each other in the form of a wedge at the hemispherical end 13 (FIG. 4), for example, by welding at the juncture. The walls 20 extend upwardly above the bank of tubes 17 as far as the inner cylindrical surface of the tank 11 to either side of two axially spaced outlet spigots 21 disposed in the top of the tank 11. In addition, a number of rods 22 are disposed to extend diagonally within the bank of tubes 17 in order to damp out any vibrations within the bank of tubes 17.

A deflector plate 24 is located in the hemispherical end 13 of the tank 11 on both sides of the vertical central plane of the tank. These two symmetrically disposed deflector plates 24 are inclined in relation to one another to the horizontal central plane and meet in the vertical central plane which extends through the center of the hemispherical end wall 13. A spigot 25 (FIG. 4) is disposed in the hemispherical end wall 13 above the deflector plates 24 to provide an inlet for the partially expanded steam which is to flow into the tank 11 from the line 7.

Each wall has a lower wall portion 23 which adjoins the vertical portions of the walls 20 at the base and which is inclined outwardly toward the side walls of the tank 11. Each wall portion 23 extends from the front wall 12 along the whole length of the tank to merge into the deflector plates 24 inside the hemispherical end 13. Also, a wall 26 is disposed between each wall portion 23 and the adjacent cylindrical side wall portion of the tank 11. Each wall 26 is inclined upwardly and outwardly with respect to the axis of the tank 11 and is also provided with a plurality of uniformly distributed slot-like apertures 27. The apertures 27 are each of a shape such that the slot edge first contacted by the flow of steam is bent outwardly and downwardly, for example, by quarter radius of approximately slot width. Each wall 20 cooperates with the downwardly adjoining wall portion 23, wall 26 and adjacent tank wall to bound a space of gusset-like cross section in order to form a channel which acts as a distribution chamber for the partially expanded wet steam. The two channels which are formed are united in the hemispherical end 13 of the tank 11 to communicate with the spigot 25 to receive wet steam.

A gutter 28 is disposed between each wall 26 and the adjacent wall portion 23 in order to collect any separated water droplets and to convey such by pipes (not shown) to the bottom of the tank 11.

Referring to FIG. 3, the water separator elements 18 are disposed in two stages, or rows, in the lower portion of the tank 11. The upper stages of the water separator elements 18 are supported on the lower ends of the wall portions 23 to one side while the lower stages of the water separator elements 18 are each connected to an upper stage to the opposite side by an inclined wall 30 which extends from the front wall 12 as far as the beginning of the hemispherical end wall 13 and a common vertical wall 32. The inclined walls 30 are disposed between the upper and lower stages of the separator elements so as to direct the wet steam in the lower tank portion of flow in parallel through the water separator elements of the two stages. In addition, each of the inclined walls 30 carries a water gutter 31 which collects and leads any water to suitable pipes (not shown) to the bottom of the tank 11. The vertical wall 32 is disposed in the tank 11 at the lowest point thereof and is sized to extend along the entire length of the tank while projecting upwardly to the level of the lowest stage of the water separator elements 18. Also, the wall 32 carries an inverted T section 33 on which the water separator elements 18 of the lower stage are supported. In addition, a plurality of transverse walls 41 (FIG. 4) are disposed uniformly over the length of the tank 11 in order to subdivide the lower half of the tank into a number of chambers to which partially expanded wet steam can flow in parallel. These chambers are interconnected together by apertures 45 in the walls 41 through which the water separator elements 18 are inserted as well as by apertures 46 for the separated water in the lower portion of the tank 11.

In operation, partially expanded wet steam enters the tank 11 through the spigot 25 in the hemispherical end wall 13 from the line 7 leading from the high pressure turbine 1 (FIG. 1). The partially expanded wet steam then flows in parallel in the direction indicated by the arrows 35 (FIG. 4) through the two channels of gusset-like cross section on either side of the bank of tubes 17. The wet steam is then uniformly distributed circumferentially of the tank through the apertures 27 into the lower portion of the tank 11. Due to the inclination of the apertures 27, the steam is deflected against the inner tank walls so that large and medium water droplets are immediately separated out. The wet steam then fills the lower portion of the tank so that a first portion of each flow of steam flows in the direction indicated by the arrows 37, 38 through the upper stage of water separator elements 18 and a remaining second portion flows in the direction indicated by the arrows 39, 40 through the lower stage of the water separator elements 18. In flowing through the respective water separator elements 18, the wet steam is further dehydrated so as to deposit out any fine water droplets. Thereafter, the dried steam flows around the pipes of the tube banks 17 and is superheated by the high pressure steam passing through the respective pipes of the bank 17, which is delivered from the line 8 branched from line 6 (FIG. 1).

After passing through the tube bank 17, the superheated steam leaves the unit 10 through the spigots 21 at the upper end and passes on to the low pressure stage 2 of the steam power station via line 7' (FIG. 1). In addition, the water which collects at the bottom of the tank 11 is discharged through a spigot (not shown).

It is noted that the vertical wall 32 in the lower portion of the tank 11 prevents turbulence which might otherwise occur if the two steam flows indicated by arrows 40 met at high speed. The wall 32 thus functions to stabilize the two flows against such turbulance. It is also noted that at lower speeds of flow the wall 32 can be eliminated.

It is further noted that the apparatus of the invention can be modified so that instead of using slot-like apertures 27, as above described, each distribution channel can have a gap which extends along the tank wall and which acts as a connecting aperture. In this case, the wall 26 is omitted and the wall portion 23 is continued to a point adjacent the tank side wall.

It is further noted that instead of using one inlet spigot, two inlet spigots can be provided, that is, one for each distribution channel. In this case, the two inlet spigots as well as the outlet spigot can be located on a common circumferential line of the tank so that only a single reinforcing member need be used for the three spigots.

What is claimed is:

1. An apparatus for separating water from wet steam comprising
   a horizontally disposed tank;
   a bank of superheated tubes disposed in the upper portion of said tank extending longitudinally thereof;
   at least one water separator element disposed in the lower portion of said tank below said bank of superheater tubes and extending longitudinally thereof;
   a pair of wall means on opposite sides of said superheater tubes extending longitudinally of said tank and defining a guide passage from said water separator element to said bank of superheater tubes, each of said wall means defining a longitudinally elongated horizontally disposed distribution chamber opposite said guide passage in said upper portion;
   inlet means at one end of said tank for introducing wet steam into each of said distribution chambers;
   at least one aperture in each of said wall means for conveying a flow of said wet steam from said distribution chamber therein into the lower portion of said tank for passage through said water separator element into said guide passage in a direction toward said bank of superheated tubes; and
   outlet means in said tank in communication with said bank of superheated tubes for passage of steam therethrough.

2. An apparatus as set forth in claim 1 wherein each of said wall means includes a wall adjacent the sidewall of said tank inclined in a downward direction to the vertical central plane of said tank and having a plurality of said apertures therein.

3. An apparatus as set forth in claim 2 wherein each of said apertures is in the form of a slot having an edge nearest the flow of steam curved in the direction of said lower tank portion on a quarter radius of slot width whereby wet steam is hurled against said tank sidewall upon entry into said lower portion.

4. An apparatus as set forth in claims 1, 2 or 3 which further comprises a vertical wall in said lower tank portion extending from said water separator elements to the bottom of said tank to subdivide said lower portion into two parallel chambers.

5. An apparatus as set forth in claims 1, 2, 3 or 4 wherein said distribution chambers are connected together at said one end of said tank in common communication with said inlet means.

6. An apparatus as set forth in claim 1 further comprising a plurality of spaced transverse walls in said lower portion dividing said lower portion into a number of chambers for parallel flow of steam therethrough, each of said transverse walls having an aperture therein communicating adjacent chambers with each other.

7. An apparatus as set forth in claim 1 wherein said tank is cylindrical.

References Cited
UNITED STATES PATENTS 3,068,629  12/1962  Jones _____ 55—349

FOREIGN PATENTS 931,235  7/1963  Great Britain.

KENNETH W. SPRAGUE, Primary Examiner

U.S. Cl. X.R.

122—483, 491